United States Patent [19]

Kelly et al.

[11] 4,056,379
[45] Nov. 1, 1977

[54] FORMING V BENDS IN GLASS SHEETS BY PRESS BENDING

[75] Inventors: Joseph B. Kelly; Kenneth A. Gibson, both of Crestline, Ohio

[73] Assignee: PPG Industries, Inc., Pittsburgh, Pa.

[21] Appl. No.: 756,209

[22] Filed: Jan. 3, 1977

[51] Int. Cl.² .......................................... C03B 23/02
[52] U.S. Cl. ...................................... 65/106; 65/103; 65/273; 65/288; 65/289
[58] Field of Search ................. 65/103, 104, 106, 273, 65/275, 288, 289

[56] References Cited

U.S. PATENT DOCUMENTS

| | | | |
|---|---|---|---|
| 2,111,392 | 3/1938 | Galey | 65/273 |
| 2,176,999 | 10/1939 | Miller | 65/107 |
| 2,215,228 | 9/1940 | Oliver | 65/107 |
| 2,999,338 | 9/1961 | Richardson | 65/273 |
| 3,248,195 | 4/1966 | Golightly et al. | 65/107 |
| 3,333,935 | 8/1967 | Valchar | 65/106 |
| 3,367,764 | 2/1968 | Seymour | 65/291 |
| 3,762,903 | 10/1973 | Hamilton | 65/107 |
| 3,762,904 | 10/1973 | Hamilton et al. | 65/107 |
| 3,795,501 | 3/1974 | Jansson et al. | 65/106 |
| 3,795,570 | 3/1974 | Jansson et al. | 65/100 X |
| 3,837,833 | 9/1974 | Couture et al. | 65/288 |
| 3,847,586 | 11/1974 | Reese et al. | 65/290 |
| 3,865,680 | 2/1975 | Reese et al. | 65/107 X |
| 3,879,184 | 4/1975 | Hamilton et al. | 65/107 |
| 3,960,535 | 6/1976 | Hamilton et al. | 65/104 |

FOREIGN PATENT DOCUMENTS

| | | |
|---|---|---|
| 799,907 | 11/1968 | Canada. |
| 900,720 | 5/1972 | Canada. |
| 1,215,559 | 11/1959 | France .................. 65/106 |

Primary Examiner—Arthur D. Kellogg
Attorney, Agent, or Firm—Dennis G. Millman

[57] ABSTRACT

Heat-softened glass sheets may have sharp bends imparted thereto by pressing between complementary molds when preceded by localized heating along the intended line of the sharp bend. The localized heat is applied along the line by means of electrical resistance heating through the glass immediately prior to the pressing step.

12 Claims, 4 Drawing Figures

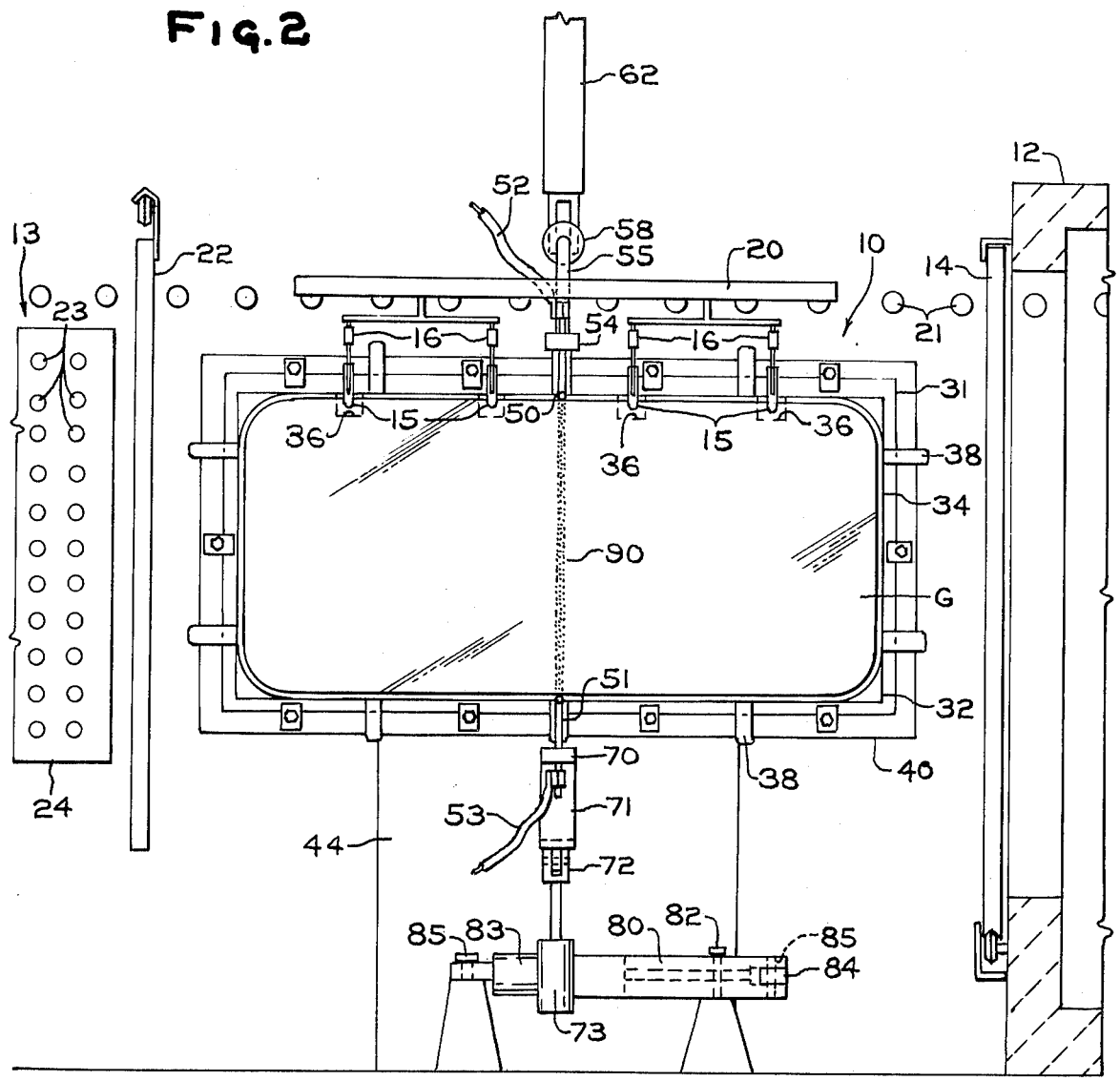
Fig. 2
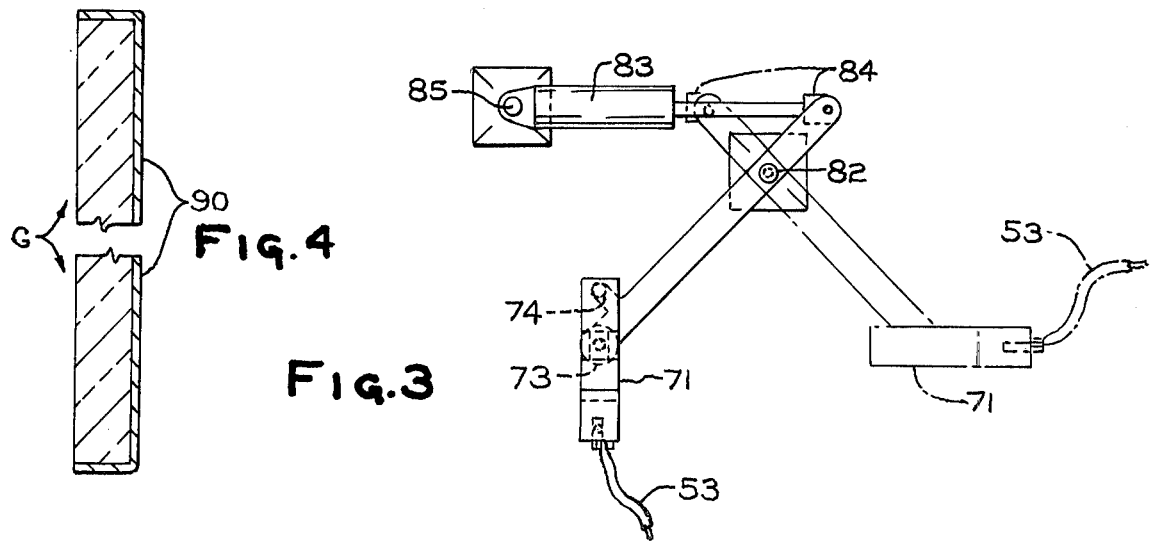
Fig. 4
Fig. 3

FORMING V BENDS IN GLASS SHEETS BY PRESS BENDING

BACKGROUND OF THE INVENTION

This invention relates to the shaping of heat-softened glass sheets or the like by pressing the sheets between two rigid pressing members of complementary curvature. This technique, known as press bending, lends itself to relatively inexpensive mass production of bent glass sheets within precise tolerances. More particularly, the invention relates to press bending glass sheets so as to produce bends of very sharp curvature known as "V" bends.

Press bending in general is well known in the art, as exemplified by U.S. Pat. No. 3,367,764 to S. L. Seymour. Prior art press bending processes, however, have been limited as to the sharpness of curvature which may be imparted to the glass, a minimum radius on the order of about 9 inches (23 centimeters) or more being typical of commercial press bending installations. It would be desirable to produce "V" bends having radii less than 8 inches (20 centimeters), preferably on the order of 4 inches (10 centimeters) or less.

The production of sharp "V" bends has heretofore been most commonly carried out by gravity sag bending processes, wherein glass sheets are placed on contoured outline molds in a generally horizontal orientation and heated to the softening point of the glass so that the glass sags to conform to the shape of the mold. In order to cause such a bend to be concentrated along a so-called "hot line" to form a "V" bend, localized heat is applied along that line by electric resistance heating through a wire or ribbon held close to or in contact with the glass or through an electroconductive substance applied to the glass. The use of a heated wire or ribbon is disclosed in U.S. Pat. No. 3,795,501 to R. A. Jansson and T. J. Reese; U.S. Pat. No. 3,795,570 to R. A. Jansson and D. L. Thomas; U.S. Pat. No. 3,847,586 to T. J. Reese, G. R. Claassen, and M. W. Tobin; U.S. Pat. No. 2,111,392 to J. H. Galey; U.S. Pat. No. 2,176,999 to R. A. Miller; U.S. Pat. No. 2,215,228 to J. G. Oliver; U.S. Pat. No. 3,248,195 to J. S. Golightly and H. E. McKelvey; and U.S. Pat. No. 2,999,338 to R. L. Richardson. The use of electroconductive stripes applied to the glass surfaces is disclosed in U.S. Pat. No. 3,762,903 to H. E. Hamilton; U.S. Pat. No. 3,762,904 to H. E. Hamilton, R. E. Bamford, and P. Pastorek; U.S. Pat. No. 3,879,184 to H. E. Hamilton and I. L. Soreghy; and U.S. Pat. No. 3,865,680 to T. J. Reese and H. S. Koontz.

Prior to this invention it has been proposed to apply localized heat to glass sheets in a press bending operation, but not in a manner compatible with forming "V" bends. One such proposal is disclosed in Canadian Pat. No. 799,907 to R. E. Richardson where the leading edge of each glass sheet is heated in the press bending station in order to equalize the temperature of the sheets from leading edge to trailing edge. The heat is provided by radiant heaters aimed at the general region of the sheet near the leading edge. U.S. Pat. No. 3,333,935 to C. E. Valchar and S. J. Mrozinski shows a press bending method wherein the lower portion of each glass sheet is given additional heat by means of a pair of gas burners in order to enable that portion of the sheet to be bent to a sharper curvature. Such an arrangement, however, does not produce the narrow, precisely located lines of heating which are required for making "V" bends. Another use of localized heat during press bending is disclosed in U.S. Pat. No. 3,960,535 to H. E. Hamilton and W. W. Oelke, which discloses the application of heat with gas burners to the portion of glass sheets around holes in the sheets during press bending. The object is to maintain equalized temperature conditions in the glass, and therefore has very little in common with the production of "V" bends. Canadian Pat. No. 900,720 shows a press bending mold with a plurality of elongated electrical heating elements extending along vertical lines in the mold, but the heating elements are beneath the surface of the mold since their purpose is to warm the entire mold face, not to impart localized heat to the glass.

SUMMARY OF THE INVENTION

The present invention entails the application of a stripe of electroconductive material onto the major surface of a glass sheet along a line corresponding to the intended location for a "V" bend. The sheet, with the stripe in place, is heated as a whole to a temperature suitable for bending in the conventional manner by passing the sheet through a furnace. Upon leaving the furnace, the sheet is stopped between opposing, complementary press members, but before the press members are actuated, a pair of electrodes are moved into contact with the electroconductive stripe at opposing edges of the glass sheet so as to complete a circuit through the electroconductive stripe. A high voltage current is passed along the line defined by the stripe for a few seconds so as to heat the glass along the line to a temperature higher than that of the body of the glass. The electrodes are then withdrawn and the pressing commences immediately in the usual manner. The localized heating along the line of the "V" bend enables press bending to produce a radius of curvature well below 8 inches (20 centimeters).

THE DRAWINGS

FIG. 2 is a longitudinal section of the press station of FIG. 1.

FIG. 3 is a plan view of the lower electrode arrangement of FIGS. 1 and 2.

FIG. 4 is a fragmentary, enlarged sectional view of a glass sheet showing how the stripe is applied to a major surface and opposite edge surfaces of a glass sheet in the preferred embodiment of the invention.

DETAILED DESCRIPTION

Figure 1:
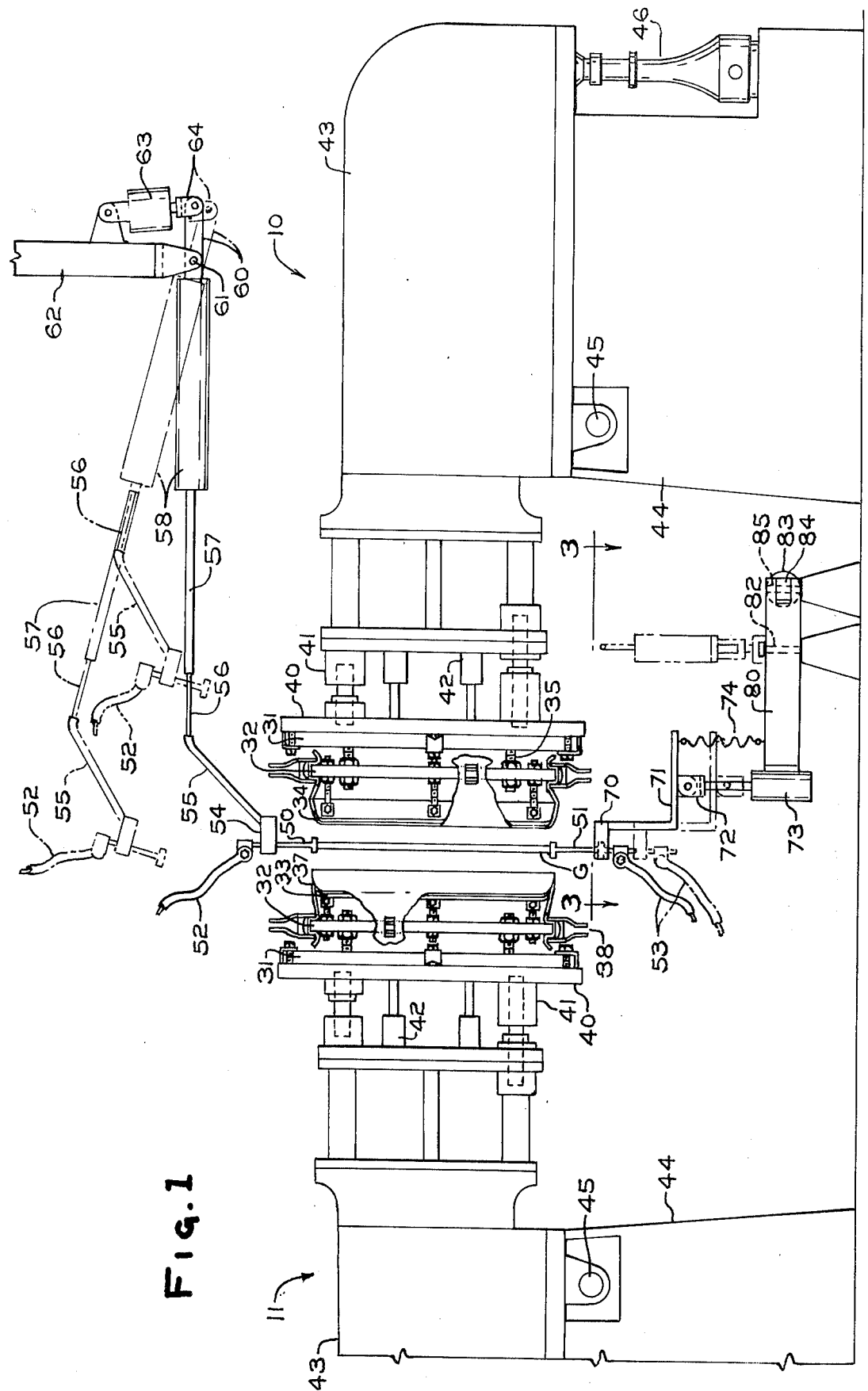
FIG. 1 is an end view, looking downstream, of a typical vertical press station in a press bending operation incorporating the hot line heating means of the present invention.

FIG. 1 includes an edge-wise view of a sheet of glass G which has been transported from a furnace and is in position to be bent by a pair of opposing presses 10 and 11. When viewed from the side as in FIG. 2, it can be seen that the bending station lies between the exit end of a furnace 12 and a quenching station 13. The furnace 12 is provided with a door 14 which slides open for each sheet of glass to pass from the furnace.

Each sheet of glass is suspended by tongs 15 which are in turn hung from a carriage 20 which is propelled (from right to left in FIG. 2) along a conveyor 21. (For clarity, the means to support and convey the glass sheets have not been shown in FIG. 1). The carriage and conveyor are electrically insulated from the glass sheet and the glass supporting tongs 15 by means of insulator blocks 16 for reasons discussed in a copending U.S. Patent application Ser. No. 756,211, of Joseph B. Kelly, filed on Jan. 3, 1977, the disclosure of which is incorporated herein by reference. The quench station may be provided with a baffle 22 at its entrance end to prevent quenching air from blowing back into the bending station. The baffle 22 may slide or pivot to permit each glass sheet to pass into the quench station. The glass sheets are usually rapidly cooled in the quenching station so as to impart a temper to the glass. Cooling is effected by directing blasts of air at the opposite sides of the sheets from a large number of orifices 23 in a pair of opposed blast heads 24, all of which may take a variety of forms known in the art.

The press bending station shown in the drawings is a preferred arrangement as described in U.S. Pat. No. 3,367,764 to S. L. Seymour, the disclosure of which is hereby incorporated by reference. Since the presses themselves form no part of the present invention, only a brief outline of their construction and operation need be set forth here in order to understand the present invention. The shaping members of the opposed presses 10 and 11 are each comprised of a triple plate arrangement of a backplate 31, adjusting plate 32, and a shaping plate which is either a convexly curved shaping plate 33 on one side or a complementary concavely curved shaping plate 34 on the other side. The plates are adjustably fastened by a large number of threaded rods 35 and nuts (only a representative number are shown in FIG. 1). By turning the nuts, the curvature on the face of the shaping member can be adjusted.

Each curved shaping plate 33 is provided with a series of notches 36 along the upper edge portion thereof. The notches on the shaping plate for press 10 are aligned with corresponding notches 36 on the shaping plate for the press 11. The position of each tong 15 is adjusted so that it is received in one or another of the aligned pairs of tong slots 36 when the presses 10 and 11 close against the opposite major surfaces of the glass sheet G to shape the latter.

The shaping plates 33 and 34 are depicted as having a sharp line of bend running vertically across the center. When the glass is being bent through a relatively large angle, it is sometimes preferred that the concave shaping member be provided with hinged segments so as to follow the glass as it bends. In the illustrated example, it may be advantageous to divide the concave shaping member into right and left hand sections hinged together to bend along an axis of rotation in a vertical plane that intersects the line of sharp bend. The glass-facing surfaces of both shaping plates 33 and 34 are covered with a material 37 which does not harm glass at elevated temperatures, such as stretchable fiber glass cloth made of texturized yarns. The cover is held in place against the glass-facing surfaces by a number of clamps 38 secured to the margin of the adjusting plate 32 or any other convenient structural member.

In the embodiment shown in the drawings, each shaping member is clamped onto a frame 40 carried on a housing 43, which reciprocates in an approximately horizontal direction relative to base 44. Shock absorber means 41 and return spring means 42 limit the impact of the pressing action on the glass sheets. Each housing 43 may be tilted by means of a pivot 45 and a cylinder 46 so as to reciprocate at an angle slightly off horizontal, which is sometimes found advantageous for reducing the pull of the tongs on the glass during pressing. It should be apparent that the present invention is not limited to the vertical mode of press bending, but can also be applied to other press bending arrangements known in the art where the sheets of glass are held in generally horizontal or oblique orientations.

The sheet of glass G is shown in the drawings as stopped in alignment with the shaping members and with an upper electrode 50 and a lower electrode 51 in contact with opposite edges of the glass in preparation for the application of a localized line of heat between the electrodes. The electrodes are preferably made of tungsten carbide and may be "T" shaped, with the cross member of the "T" contacting an adjacent edge of the sheet and extending transversely to the edge of the sheet so as to render alignment less critical and to assure good electrical contact. Electrical leads 52 and 53 connect the electrodes with a source of high voltage electric current (not shown). It has been found that such an electrode arrangement also provides a secondary advantage by serving to steady the glass sheet immediately before the pressing operation.

The upper electrode 50 is mounted in an electrode holder 54 comprising a block of insulating material such as a high temperature resistant, fiber glass reinforced plastic material like those identified by the trademarks Mycarta or Bakelite. The electrode block 54 is attached to an arm 55 which is in turn affixed to the end of an extension rod 56. The extension rod 56 is preferably a steel rod of sufficiently small diameter to impart some springiness to the outer end of the upper electrode mounting assembly so as to avoid damaging the glass when the electrode is brought into contact therewith. The extension rod 56 is fastened to the end of a piston rod 57 of a pneumatic cylinder 58. The cylinder is mounted on one end of a rocker arm 60 which is pivoted at its middle on a pin 61 held by a support beam 62 which may be rigidly affixed to any convenient point on existing adjacent structures. The other end of the rocker arm 60 is engaged by a small cylinder 63 by means of a clevis 64 so that cylinder 63 may impart an oscillatory motion in a vertical plane to the entire upper electrode assembly, thereby moving the upper electrode vertically into and out of contact with the glass. At the same time, the larger cylinder 58 can be actuated to reciprocate the upper electrode in a horizontal direction.

Thus, after a hot line has been created in the glass, the upper electrode may be retracted by raising it above the level of the press members and withdrawing it from between the tongs 15 as shown by the broken line positions in FIG. 1. With the electrode out of the way, the presses may then be brought together to bend the glass, and after the presses are parted, the glass may be conveyed out of the pressing station. When the next sheet of glass is conveyed into the pressing station and stopped, the reverse motion is imparted to the electrode, whereby it is extended between the tongs and lowered into contact with the top edge of the glass.

Lower electrode 51 is likewise provided with means to carry the electrode into and out of contact with the glass. The lower electrode is carried in an electrode holder 70 which, like the upper electrode holder 54, is formed from a block of insulating material. Electrode holder 70 is fastened at the upper extremity of an "L" shaped arm 71 which is pivotally mounted by means of a clevis 72 to the end of a piston rod of a vertically oriented pneumatic cylinder 73. The electrode end of arm 71 is urged upwardly by a spring 74 connected to the other end of the arm, thereby assuring firm but resilient contact between the electrode and the glass.

The pneumatic cylinder 73 is carried at one end of a swingable boom 80 which pivots in a horizontal plane about a vertical post 82. The boom 80 is swung between an operative position and a retracted position by another pneumatic cylinder 83 which is linked to the opposite end of the boom from cylinder 73 by means of a pivot joint 84. Cylinder 83 is supported at one end on a pivot post 85.

Thus the lower electrode assembly is provided with two modes of movement. Cylinder 73 raises and lowers the electrode 51 vertically between the raised position shown in FIG. 1 and the lowered position shown in broken lines in FIG. 1 so that the lower electrode may be brought into contact with the lower edge of the glass sheet for passing current across the sheet and then withdrawn so as not to interfere with the closing of the press. The horizontal motion provided by cylinder 83 enables the lower electrode to be swung to the side, out from under the glass sheet, so as to avoid any damage to the electrode which might occur as a result of falling glass from accidental breakage which sometimes takes places in the press bending station. The entire lower electrode assembly is thereby rotated to bring the electrode to a retracted location as shown by broken lines in FIG. 1 and more clearly illustrated in the plan view of FIG. 3. The extending and retracting of both upper and lower electrodes are carried out in unison, preferably by automatic control means responsive to the location of the glass sheet.

The simultaneous engagement of the electrodes 50 and 51 against the upper and lower edges of the glass sheet G steadies the position of the latter and minimizes swaying. Thus, when the electrodes 50 and 51 retract from contact with the glass and the presses 10 and 11 engage the glass sheet G, each pair of corresponding slots 36 becomes aligned with the corresponding tong 15, thus avoiding tong damage and minimizing damage to the glass in the vicinity of the tong gripping areas.

As shown in FIG. 1, the glass sheet has a stripe 90 of electroconductive material applied to one surface of the sheet along the line of the intended sharp bend. The stripe may extend onto the top and bottom edge surfaces of the sheet as depicted in FIG. 4 so that the "T" shaped electrodes may make good electrical contact with the stripe. Other possible electrode configurations may not require that the stripe extend onto the edges of the glass sheets. Electroconductive materials suitable for the stripe include silver frits of the type disclosed in U.S. Pat. Nos. 3,762,903; 3,762,904; 3,879,184; and 3,865,680; and graphite. Either may be applied onto the glass in liquid or paste form by brushing, rolling, or extruding. A dispersion of colloidal graphite in water found particularly suitable for use as the stripe material is sold under the name DAG 137 by Acheson Colloids Company.

When electric current is passed through the stripe, its high resistance generates heat in the stripe which is imparted to the underlying glass. As the temperature of the glass increases, its electrical conductivity increases to a level where the glass itself becomes the main conductor of the current so that heat is generated within the glass itself. The heating process fuses a silver frit to the glass, thereby making it a permanent part of the glass sheet. Graphite, on the other hand, is oxidized during the heating to an easily removed deposit on the surface of the glass, although at higher power levels graphite is sometimes completely removed. Width of the stripe will vary in accordance with its resistance requirement and the sharpness of the bend being made, but as an example, graphite stripes about ⅛ inch (8 millimeters) to 3/16 inch (5 millimeters) wide have been successfully used to produce "V" bends of 20° to 30° within a ⅜ inch (9.5 millimeters) wide portion of the glass.

The resistance of the stripe, the voltage and amperage applied to the stripe, and the amount of time available for heating the stripe are all interdependent variables, each of which may have a rather wide range of feasibility. The basic requirement is that, within the time available, sufficient thermal energy must be imparted to the hot line to appreciably lower the viscosity of the glass along that line below the viscosity of the body of the glass sheet. For example, in one press bending operation of the type shown in the drawings, the glass usually leaves the furnace at a temperature of about 1160° F. (627° C.) to about 1250° F. (677° C.). When producing "V" bends, the surface temperature along the hot line was observed to typically reach an estimated minimum of 1500° F. (816° C.) and possibly as high as 2200° F. (1204° C.), an increase of at least 250° F. (139° C.).

The chief process constraint will usually be the amount of time available for applying the hot line. Since the glass begins losing heat as soon as it leaves the furnace, it must be bent and tempered without delay before the glass temperature drops below critical levels. Therefore, only a few seconds can usually be spared for the additional step of applying the hot line, and part of that time must be consumed by bringing the electrodes into position. The time available will vary from one installation to another, depending largely upon the speed of the glass conveyor and the thickness of the glass (thinner sheets must be processed more rapidly). As an example, in the installation referred to above, a five second delay in the pressing sequence (2 seconds for the electrodes to engage the glass, 3 seconds for heating) was sufficient for producing hot lines without detracting from the quality of the temper subsequently imparted to 7/32 inch (5.6 millimeters) thick glass sheets. Normally, excessive power levels would be required to accomplish the hot line heating in much less than 2 seconds, and seldom would more than 10 seconds be available if the glass is to be tempered.

The resistance of the stripe and the voltage and amperage of the current applied to the stripe must be selected so as to provide enough power to produce the desired temperature rise within the available time. High resistances are preferred for the stripe, but the resistance must, of course, be less than that of the glass itself and it should not be so high as to require hazardously large voltages. For a typical stripe length on the order of about 20 inches (50 centimeters), the resistance may most conveniently lie in the range of about 5,000 ohms to 30,000 ohms (measured at room temperature). The voltage in such a case may be about 2,000 to 13,000 volts A.C., but higher voltages may be used if the electrodes are spaced far enough from nearby conductive structures to prevent arcing. In the 2,000 to 13,000 volt range, an air gap of about 7 inches (18 centimeters) around the electrodes should provide an adequate margin of safety. The corresponding amperage may be, for example, about 0.5 to 2.5 amps.

The following two examples illustrate typical conditions under which "V" bends having radii of about 4 inches (10 centimeters) may be made by vertical press bending.

|  | Example 1 | Example 2 |
|---|---|---|
| Glass thickness: | 7/32 inch (5.6 millimeters) | 7/32 inch (5.6 millimeters) |
| Stripe length (graphite): | 19 inches (48 centimeters) | 19 inches (48 centimeters) |
| Voltage: | 3,000 volts A.C. | 12,500 volts A.C. |
| Amperage: | 1.75 amps | 1.6 amps |
| Heating Time: | 3 seconds | 3 seconds |
| Power: | 4.37 kilowatt-hours | 17.0 kilowatt-hours |

The stripe may be applied to either side of the glass. When on the concave side of the bend, a ridge is formed in the bent glass along the line of bend; when on the convex side, a slight depression along the line of bend is produced. In either case, it appears that the glass near the surface in direct contact with the stripe becomes considerably hotter than the glass near the opposite surface along the line. As a result, a hinge-like effect is obtained since one side of the hot line remains more viscous than the other side, an effect which is advantageous in that it prevents stretching and tearing of the glass sheet along the hot line.

It should be understood that other variations and modifications as are known to those in the art may be resorted to without departing from the spirit and scope of the invention as defined by the appended claims.

I claim:

1. A method of bending a glass sheet into a shape which includes a line of sharp bending about which the radius of curvature is less than 8 inches, comprising the steps of:
    applying an electroconductive stripe onto a surface of a sheet of glass along a line of intended sharp bending;
    heating the sheet of glass in a heated enclosure to an overall temperature suitable for bending;
    removing the sheet of glass from said heated enclosure and passing electric current through the stripe so as to heat the line of intended sharp bending to a temperature higher than said overall temperature of the glass sheet; and
    bending the sheet of glass to the desired curvature, including said sharp bend of less than 8 inches radius, by pressing it between two shaping members having shaping surfaces of complementary curvature.

2. The method of claim 1 wherein the sheet of glass is stopped in alignment with said shaping members while electric current is being passed through the stripe.

3. The method of claim 2 wherein the glass sheet is hung in a generally vertical orientation from tongs gripping an edge of the sheet during said heating and pressing steps.

4. The method of claim 1 further including the step of rapidly cooling the sheet of glass to impart a temper thereto subsequent to said pressing step.

5. The method of claim 1 wherein the step of passing electric current through the stripe raises the temperature along the line of sharp bending to a temperature at least 250° F. above said overall temperature.

6. The method of claim 5 wherein the electric current is passed along said line of intended sharp bending for about 2 to 10 seconds.

7. The method of claim 5 wherein the electric current is about 2,000 to 13,000 volts A.C. at 0.5 to 2.5 amps, and the stripe has a cold resistance of about 5,000 to 20,000 ohms.

8. The method of claim 1 wherein the stripe is graphite and is oxidized by the electric current.

9. An apparatus for bending a sheet of glass comprising:
    a heated enclosure, including means to heat a sheet of glass to a softened condition suitable for bending;
    a pair of opposed shaping members located outside said furnace and having complementary shaping surfaces conforming to the desired shape for the glass, including a line of sharp bending about which the radius of curvature is less than 8 inches;
    means to bring the shaping members into pressing contact against opposite surfaces of a glass sheet supported therebetween;
    means to convey a glass sheet into and out of said heated enclosure and into and out of pressing position between said shaping members;
    a pair of electrodes located on opposite sides of the pressing position, said electrodes having means associated therewith for moving the electrodes into and out of contact with opposite edges of a glass sheet when the sheet is located between said pressing members; and
    means for supplying electric current to the electrodes so that electric current may be passed along the line of sharp bending in the glass sheet while the glass sheet is positioned between the shaping members.

10. The apparatus of claim 9 wherein said conveying means includes a plurality of tongs from which a glass sheet may be hung in a generally vertical orientation.

11. The apparatus of claim 10 wherein said electrodes are spaced apart vertically so as to contact a top and a bottom edge of a glass sheet when the sheet occupies said pressing position and said shaping members are spaced apart from one another.

12. The apparatus of claim 11 wherein said means for moving the electrodes includes means to impart both vertical and horizontal motion to each electrode.

* * * * *